(12) United States Patent
Nagasaka et al.

(10) Patent No.: US 6,836,460 B2
(45) Date of Patent: Dec. 28, 2004

(54) DISK DRIVINGLY ROTATING DEVICE WITH CENTERING MECHANISM

(75) Inventors: Hideo Nagasaka, Kanagawa (JP); Yasuo Osada, Saitama (JP); Renji Tamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/089,111

(22) PCT Filed: Jul. 27, 2001

(86) PCT No.: PCT/JP01/06510

§ 371 (c)(1),
(2), (4) Date: Jul. 15, 2002

(87) PCT Pub. No.: WO02/11127

PCT Pub. Date: Feb. 7, 2002

(65) Prior Publication Data

US 2002/0180286 A1 Dec. 5, 2002

(30) Foreign Application Priority Data

Jul. 28, 2000 (JP) ............................... 2000-229733

(51) Int. Cl.⁷ ........................................... G11B 17/022
(52) U.S. Cl. ..................................................... 369/266
(58) Field of Search ............................. 369/266, 75.2, 369/271; 360/99.05, 99.12; 29/732

(56) References Cited

U.S. PATENT DOCUMENTS 3,658,347 A * 4/1972 Cheeseboro ............... 369/266
3,912,283 A * 10/1975 Hammond et al. ......... 369/266
5,761,794 A * 6/1998 Choi .............................. 29/732
6,038,206 A * 3/2000 Mukawa ..................... 369/271
6,160,780 A * 12/2000 Furukawa et al. ......... 369/75.2
6,181,671 B1 * 1/2001 Ikawa et al. ................ 369/266
6,510,122 B1 * 1/2003 Yamauchi et al. .......... 369/266

FOREIGN PATENT DOCUMENTS

| JP | 05325365 A | * 12/1993 |
| JP | 5-325365 | 12/1993 |
| JP | 6-203446 | 7/1994 |
| JP | 06203446 A | * 7/1994 |
| JP | 8-096459 | 4/1996 |

* cited by examiner

Primary Examiner—Tianjie Chen
(74) Attorney, Agent, or Firm—Oblon, Spivak, McClelland, Maier & Neusadt, P.C.

(57) ABSTRACT

This invention provides a disc driving device used for rotationally driving a disc-shaped recording medium, comprising: a motor (3) in which a rotary shaft (2) attached to a rotor housed in a case (1) is provided to protrude from the case; and a turntable (4) having a setting portion (4d) for setting a disc (201) thereon and a cylindrical portion (4a) provided to protrude inward, and mounted on the proximal end side of the rotary shaft (2) so as to cover the proximal end side of the rotary shaft (2) by the cylindrical portion (4a).

9 Claims, 3 Drawing Sheets

DISK DRIVINGLY ROTATING DEVICE WITH CENTERING MECHANISM

TECHNICAL FIELD

This invention relates to a disc rotational driving device used for rotationally driving a disc-shaped recording medium such as an optical disc or a magneto-optical disc.

BACKGROUND ART

Conventionally, optical recording media such as optical discs and a magneto-optical discs have been used as recording media for information signals. Recording/reproducing devices for recording/reproducing information signals to/from such discs have been provided and broadly used.

In a recording/reproducing device of this type, a disc rotational driving device for positioning, holding and rotationally driving a disc is provided. The disc rotational driving device has a motor 103 which includes a case 101 having a rotor housed therein and a rotary shaft 102 attached to the rotor and having a part protruding outward from the case 101, as shown in FIG. 1.

At the distal end of the portion of the motor shaft of the rotary shaft 102 protruding from the case 101, a turntable 104 of an integral structure is mounted. This turntable 104 is formed in a substantially circular plate-like shape and has a center hole provided at its central part. The turntable 104 is mounted at one end of the rotary shaft 102 by having the rotary shaft 102 pressed into the center hole. At the center of the turntable 104, a protruding centering portion 105 is provided. This centering portion 105 is engaged with a positioning hole 202 provided at the center of a disc 201 and aligns the center of rotation of the disc 201 with the center of rotation of the turntable 104, thus centering the disc 201 on the turntable 104. As the inner circumference of the positioning hole 202 is placed on the circumferential surface of the centering portion 105 of the turntable 104, the disc 201 is positioned and thus held. By driving the motor 103 in this state, the disc 201 is rotationally driven together with the rotor, the rotary shaft 102 and the turntable 104.

In a recording/reproducing device having such a disc rotational driving device, an optical pickup device 203 is arranged to face the disc 201 which is rotationally driven by the rotation of the disc rotational driving device, and the signal recording area is scanned by a light beam emitted from the optical pickup device 203, thereby recording/reproducing an information signal.

In the recording/reproducing device having the disc rotational driving device as described above, a predetermined spacing must be formed between the disc 201 supported by the turntable 104 and the side of the case 101 of the motor 103, that is, the proximal end side of the rotary shaft 102 protruding from the case 101, because a disc loading mechanism including a disc tray for carrying the disc 201 into the recording/reproducing device from outside, the optical pickup device 203, and a guide shaft 204 or the like for supporting the optical pickup device 203 movably in the radial direction of the disc 201 are provided there.

Therefore, the rotary shaft 102 of the motor 103 must protrude from the case 101 by a predetermined length or longer. The turntable 104 must be mounted on the distal end side of the rotary shaft 102.

Since the turntable 104 is mounted on the distal end side of the rotary shaft, there is a long distance between the rotor housed in the case 101 of the motor 103 and the disc 201 supported by the turntable 104, and the rotor of the motor 103 and the disc 201 are connected with each other only by the rotary shaft 102. Therefore, the torsional rigidity of the whole system is lowered and a resonance frequency of torsional resonance is generated in a low-frequency band.

If a resonance frequency of torsional resonance is generated in a low-frequency band as described above, torsional resonance might be generated in the rotary shaft 102 or the like when the disc 201 is rotationally driven. Therefore, accurate rotation of the disc 201 is disturbed by such resonance.

DISCLOSURE OF THE INVENTION

In view of the foregoing status of the art, it is an object of the present invention to provide a disc rotational driving device which restrains torsional resonance generated in the rotary shaft of the motor as a driving source for rotationally driving the disc, and enables stable and accurate rotation of the disc.

A disc rotational driving device according to the present invention comprises: a motor in which a rotary shaft attached to a rotor housed in a case is provided to protrude from the case; and a turntable having a setting portion for setting a disc thereon and mounted on the proximal end side of the portion of the rotary shaft protruding from the case so as to cover the proximal end portion of the rotary shaft.

In this device, a positioning portion for positioning the disc is provided on the distal end side of the rotary shaft.

Another disc rotational driving device according to the present invention comprises: a motor having a rotary shaft attached to a rotor having a smaller diameter than the diameter of a disc; and a turntable having a setting portion for setting the disc thereon and a cylindrical portion provided to protrude inward, and mounted on the proximal end side of the rotary shaft so as to cover the proximal end side of the rotary shaft by the cylindrical portion.

The other objects and advantages of the present invention will be further clarified from the following description of the embodiment.

BEST MODE FOR CARRYING OUT THE INVENTION

The specific structure of the disc rotational driving device according to the present invention will now be described with reference to the drawings.

The disc rotational driving device according to the present invention is a device which is used in a disc recording/ reproducing device using a disc-shaped recording medium such as an optical disc or a magneto-optical disc as a recording medium, and which is adapted for positioning, holding and rotationally driving the disc.

Figure 1:
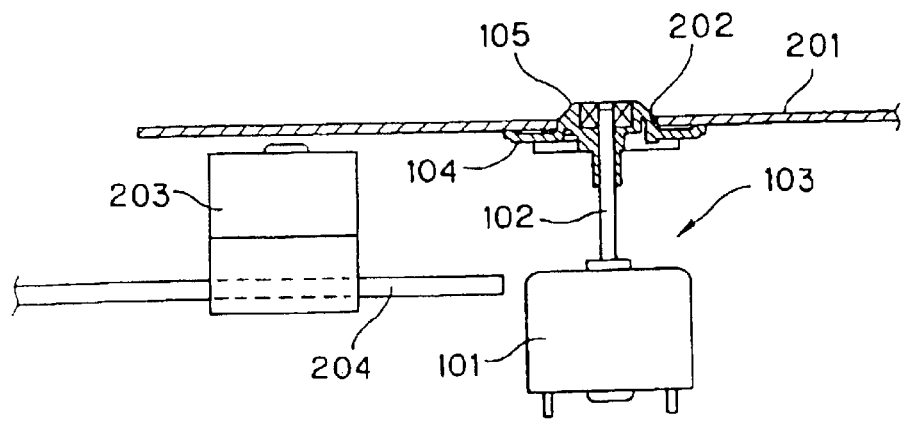
FIG. 1 is a longitudinal cross-sectional view showing an exemplary conventional disc rotational driving device.
Figure 2:
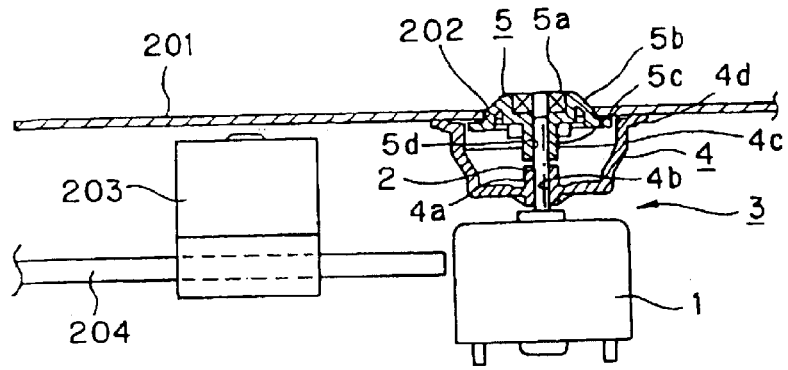
FIG. 2 is a longitudinal cross-sectional view showing a disc rotational driving device according to the present invention.

This disc rotational driving device has a motor 3 which includes a case 1 having a rotor housed therein and a rotary shaft 2 attached to the rotor and having a part protruding outward from the case 2, as shown in FIG. 2

A turntable 4 is mounted on the portion of the rotary shaft 2 protruding from the case 1. The turntable 4 is made of, for example, a synthetic resin material, and is formed in a substantially conical pedestal-like shape or in a substantially bell-like shape. The turntable 4 has a cylindrical center portion 4a protruding inward from the inner side of the upper side portion of the substantially conical pedestal-like shape or from the inner side of the substantially bell-like shape, and the center portion 4a has a center hole 4b. By pressing the rotary shaft 2 into the center hole 4b, the turntable 4 is mounted on the rotary shaft 2. As a result, the cylindrical center portion 4a covers the outer circumferential portion on the proximal end side of the rotary shaft 2. The center portion 4a of this turntable 4 is supported at a portion on the proximal end side from the central position in the axial direction, of the portion of the rotary shaft 2 protruding from the case 1, that is, on the proximal end side of the portion of the rotary shaft 2 protruding from the case 1. In this case, the turntable 4 formed in the substantially bell-like shape or in the substantially conical pedestal-like shape is turned upside down so that the side having a larger diameter is on the upside. That is, the turntable 4 is mounted in such a manner that a circumferential portion 4c spreads toward the distal end side of the rotary shaft 2, as shown in FIG. 2. An end portion with a larger diameter of the circumferential portion 4c of the turntable 4, shown in an upper part of FIG. 2, is a disc setting portion 4d.

On the distal end side of the portion of the rotary shaft 2 protruding from the case 1, a centering mechanism section 5 is mounted in such a manner that a part of the centering mechanism section 5 is housed in the turntable 4. In other words, the centering mechanism section 5 is provided on the rotary shaft 2 of the motor 3 in such a manner that it is surrounded by the circumferential portion 4c of the turntable 4. The centering mechanism section 5 is formed in a circular plate-like shape having a substantially conical pedestal-like protrusion, for example, by using a synthetic resin material. The centering mechanism section 5 has a cylindrical protrusion 5c having a center hole 5d at its center, and is mounted on the rotary shaft 2 by pressing the distal end side of the rotary shaft 2 into the center hole 5d. That is, the cylindrical protrusion 5c covers the outer circumferential portion on the distal end side of the rotary shaft 2 of the motor 3. The centering mechanism section 5 has, at its center, a centering portion 5a protruding in a conical pedestal-like shape. The conical pedestal-like centering portion 5a is engaged with a positioning hole 202 provided at the center of a disc 201 and aligns the center of rotation of the disc 201 with the center of rotation of the turntable 4, thus centering the disc 201 on the turntable 4. On the outer circumferential surface of the centering portion 5a, a plurality of leaf spring portions 5b are provided which press the inner circumferential edge of the positioning hole 202 outward from the inner side when the center portion 5a enters the positioning hole 202 of the disc 201. The centering mechanism section 5 is formed as an independent part separate from the turntable 4.

As the circumference of the positioning hole 202 of the disc 201 is set on the disc setting portion 4d of the turntable 4, the disc 201 is supported by the disc setting portion 4d, and the inner circumferential wall of the positioning hole 202 is abutted against the slope on the outer circumference of the centering portion 5a and moves on the slope. Thus, the disc 201 is positioned and held on the rotational driving device by the centering portion 5a; By rotationally driving the motor 3 in this state, the disc 201 is rotationally driven together with the rotor, the rotary shaft 2 and the turntable 4.

In the disc recording/reproducing device having the disc rotational driving device as described above, an optical pickup device 203 is provided to face the disc 201 which is loaded on and rotationally driven by the disc rotational driving device. The optical pickup device 203 casts a light beam to the signal recording area of the optical disc 201 which is loaded on and rotationally driven by the disc rotational driving device, and scans the signal recording area with this light beam, thereby recording an information signal to the disc 201 or reproducing an information signal recorded on the disc 201.

The optical pickup device 203 is supported to be movable in the radial direction of the optical disc 201 which is positioned and held on the turntable 4, via a guide shaft 204.

A disc loading mechanism including a disc tray, not shown, for carrying the disc 201 into the recording/reproducing device from outside is provided between the disc 201 supported on the turntable 4 and the proximal end side of the rotary shaft 2 of the motor 3 protruding from the case 1. That is, the disc 201 is pulled into the disc recording/reproducing device by the disc loading mechanism, not shown, and the disc rotational driving device shown in FIG. 2 and the disc loading mechanism are moved relatively to each other, thereby setting the disc 201 on the turntable 4 as shown in FIG. 2.

The disc rotational driving device according to the present invention realizes a higher spring constant than that of the rotary shaft 2 of the motor 3 by the structure of the turntable 4 and raises the spring constant of the entire connecting part between the rotor side of the motor 3 and the disc 201. Specifically, since the turntable 4 has a sufficiently large diameter, as shown in FIG. 2, that is, the turntable 4 has a sufficiently greater geometrical moment of inertia than the rotary shaft 2, the rigidity of the entire torque transmission path of the motor 3 is increased and the spring constant is raised.

The total length of the entire connecting part between the rotor side of the motor 3 and the disc 201, that is, the distance between the case 1 of the motor 3 and the disc 201, cannot be made a predetermined distance or shorter because the optical pickup device 203 and the guide shaft 204 or the like are arranged between them. Therefore, in order to elongate the part occupied by the turntable 4 having a large spring constant within this distance, the mounting position of the turntable 4 is set on the proximal end side closer to the case 1, of the portion of the rotary shaft 2 protruding from the case 1.

Thus, the disc rotational driving device according to the present invention can raise the resonance frequency of torsional resonance in a low-frequency band, which is a problem particularly in high-speed data reading.

Figure 3:
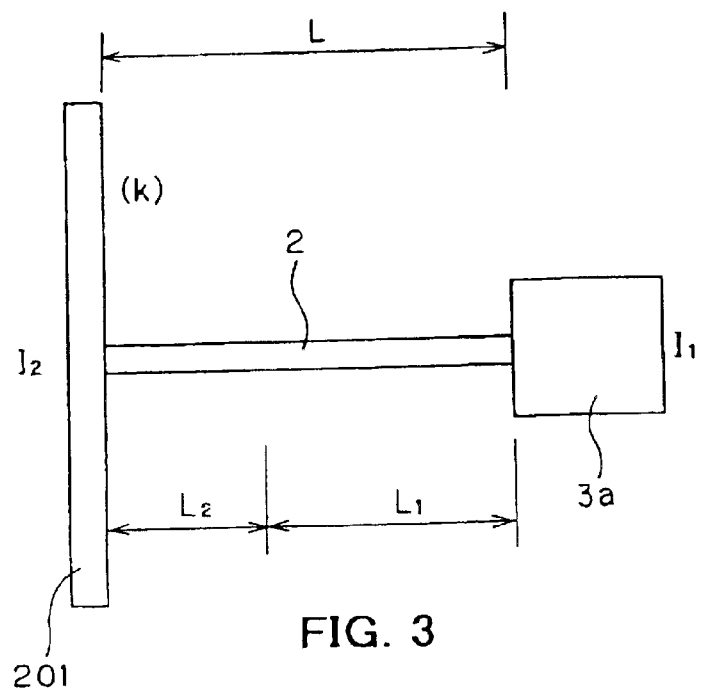
FIG. 3 is a side view showing a dynamic model of a disc rotational driving device.

The reason why the resonance frequency of torsional resonance can be raised in the above-described disc rotational driving device according to the present invention will now be described. The rotary system including the disc can be replaced by a dynamic model of a structure in which the rotor 3a of the motor 3 and the disc 201 are connected with each other by the rotary shaft 2 with a length L, as shown in FIG. 3. In this dynamic model, the proper vibration frequency $\omega_n$ in the torsional direction can be expressed by the following equation, in which k represents the spring constant of the rotary shaft 2, $I_1$ represents the moment of inertia of the rotor 3a, and $I_2$ represents the moment of inertia of the disc 201:

$$\omega_n = \sqrt{(k(I_1+I_2)/I_1 I_2)}$$

The position of the nodal point is expressed by the following equations, which hold the relation of $L_1+L_2=L$:

$$L_1 = L\{I_2/(I_1+I_2)\}$$

$$L_2 = L\{I_1/(I_1+I_2)\}$$

In short, it can be understood that the proper vibration frequency $\omega_n$ is decided by the spring constant of the connecting part (rotary shaft 2) which connects the moment of inertia $I_2$ of the disc 201 with the moment of inertia $I_1$ of the rotor 3a. In many cases, the moment of inertia $I_2$ of the disc 201 is greater than the moment of inertia $I_1$ of the rotor because the diameter of the disc 201 is much larger than the diameter of the rotor 3a of the motor 3. Therefore, the proper vibration frequency $\omega_n$ is almost decided by the spring constant of the connecting part, that is, the rotary shaft 2 in this invention, and the moment of inertia $I_1$ of the rotor 3a.

In the above-described disc rotational driving device according to the present invention, the proper vibration frequency is raised by increasing the spring constant of the connecting part (rotary shaft 2) between the two moments of inertia $I_1$, $I_2$.

Figure 4:
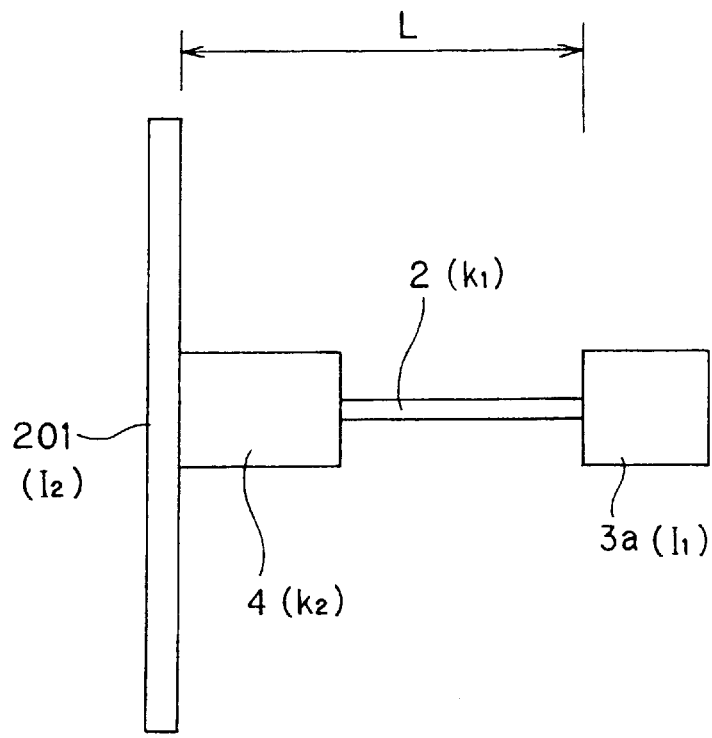
FIG. 4 is a side view showing a dynamic model of the disc rotational driving device according to the present invention.

Specifically, by constituting the connecting part using the rotary shaft 2 and the turntable 4, the spring constant of the entire connecting part is controlled without changing the shape of the rotary shaft 2. The dynamic model in this case has a structure in which the rotor 3a and the disc 201 are connected with each other by the rotary shaft 2 with a length L and in which the turntable 4, that is, the cylindrical center portion 4a, covers the portion of the rotary shaft 2 on the side of the disc 201, as shown in FIG. 4. The spring constant k of the connecting part in this case is expressed by the following equation, in which $k_1$ represents the spring constant of the rotary shaft 2 and $k_2$ represents the spring constant of the turntable 4.

$$k = k_1 \cdot k_2/(k_1+k_2)$$

Therefore, the proper vibration frequency $\omega_n$ in this case is expressed by the following equation.

$$\omega_n = \sqrt{((I_1+I_2)/I_1 I_2) \cdot (k_1 k_2/(k_1+k_2))}$$

Figure 5:
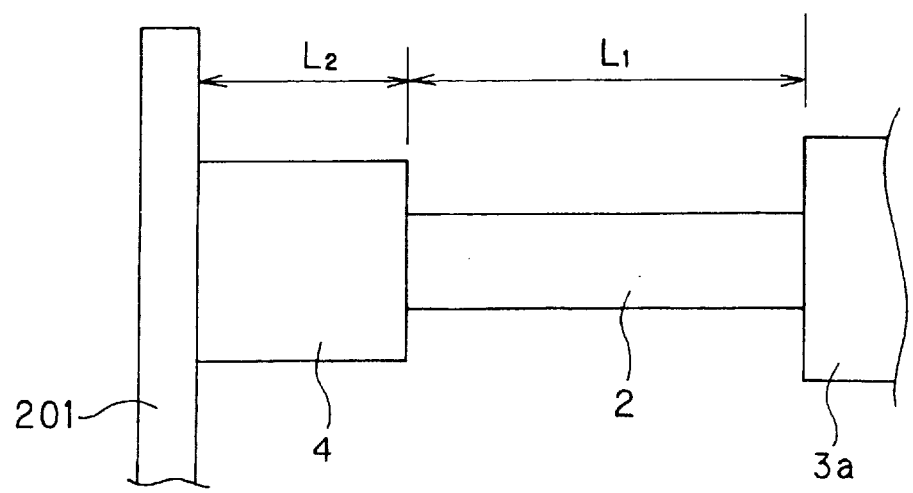
FIG. 5 is a side view showing the structure of a connecting portion in the dynamic model shown in FIG. 4.

The condition for making the spring constant k of the connecting part in this model higher than in the conventional model will now be considered. A dynamic model is used in $L_2$ represents the length of the turntable 4, $L_1$ represents the length of the portion of the rotary shaft 2 between the turntable 4 and the rotor 3a ($L_1+L_2=L$), $G_2$ represents the shear modulus of elasticity of the turntable 4, $J_{P2}$ represents the geometrical moment of inertia of the turntable 4, $G_1$ represents the shear modulus of elasticity of the portion of the rotary shaft 2 between the turntable 4 and the rotor 3a, and $J_{P1}$ represents the geometrical moment of inertia of the portion of the rotary shaft 2 between the turntable 4 and the rotor 3a, as shown in FIG. 5. By satisfying the following equation, the spring constant of the connecting part and the proper vibration frequency are made higher than in the case where only the rotary shaft 2 is used as the connecting part.

$$k = k_1 \cdot k_2/(k_1+k_2) > G_1 J_{P1}/(L_1+L_2)$$

The condition for satisfying the above equation is described hereinafter.

$$k - G_1 J_{P1}/(L_1+L_2) = (1/L) \cdot (L_2(G_2 J_{P2} - G_1 J_{P1})/(G_1 J_{P1} L_2 + G_2 J_{P2} L_1))$$

$$\therefore G_2 J_{P2} > G_1 J_{P1}$$

Therefore, the spring constant k of the connecting part is expressed as follows.

$$k = k_1 \cdot k_2/(k_1+k_2) = G_1 J_{P1} G_2 J_{P2}/(G_1 J_{P1} L_2 + G_2 J_{P2} L_1))$$

This is a monotonic decreasing function for $L_1$. It shows that a higher spring constant k is obtained for smaller $L_1$. In short, by constituting the structure of the turntable 4 so as to have a higher spring constant than the spring constant of the rotary shaft 2, the spring constant can be made higher than in the case where only the rotary shaft 2 is used for constituting the connecting part. Moreover, by elongating the portion of the turntable 4 having a high spring constant, that is, the cylindrical center portion 4a of FIG. 2, and shortening the length of the portion consisting of the rotary shaft 2 alone, the spring constant of the entire connecting part can be raised.

Figure 6:
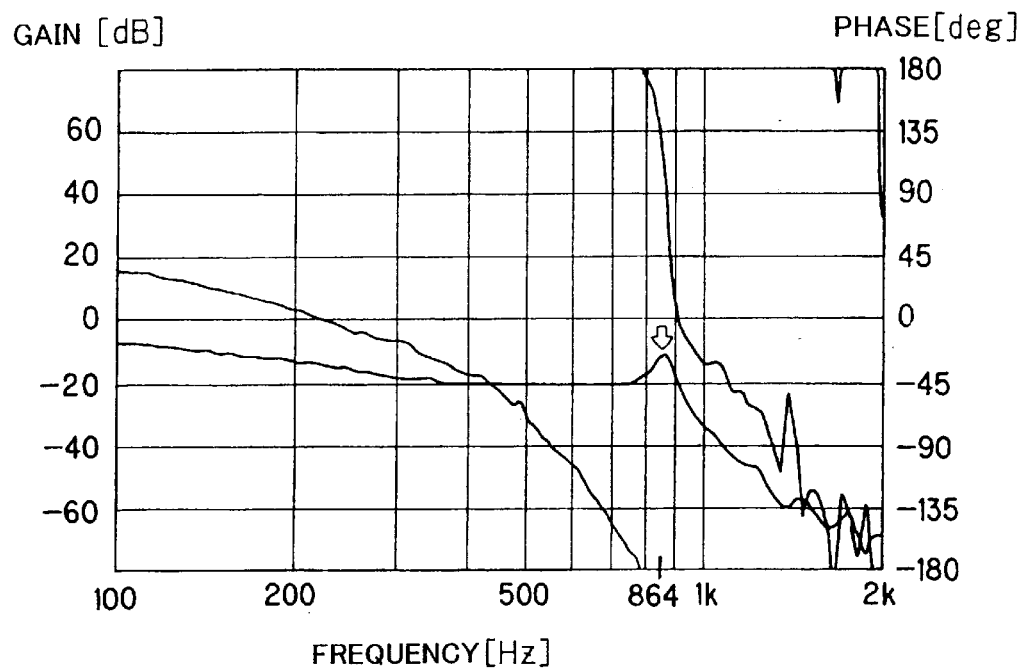
FIG. 6 is a graph showing the servo loop characteristic in the disc rotational driving device according to the present invention.
Figure 7:
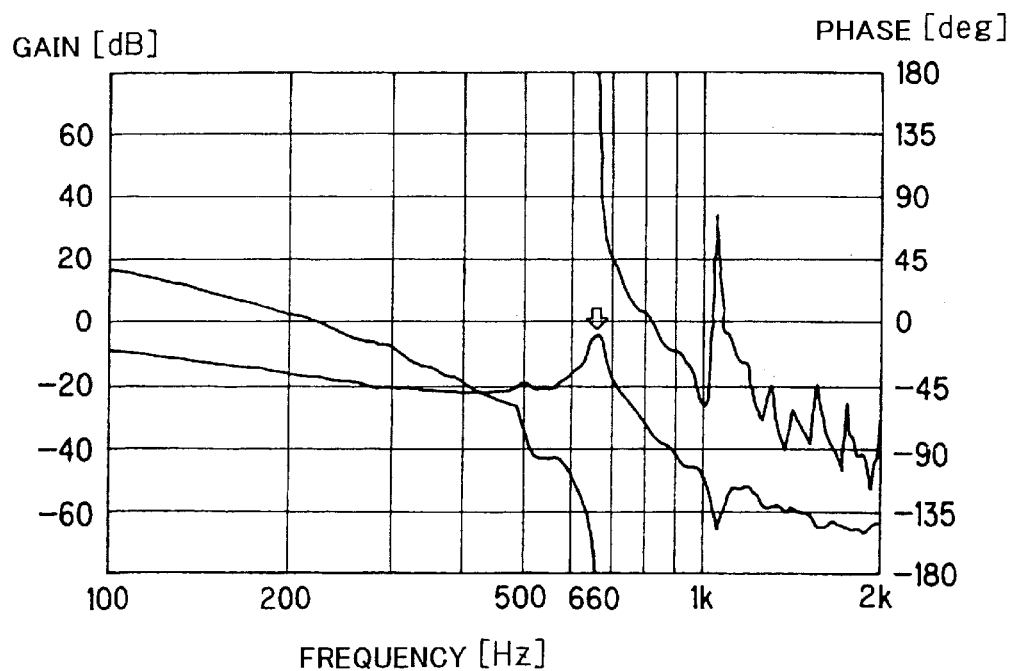
FIG. 7 is a graph showing the servo loop characteristic in the conventional disc rotational driving device.

FIG. 6 shows the servo loop characteristic in the disc rotational driving device according to the present invention shown in FIG. 2. Comparing the servo loop characteristic in the conventional disc rotational driving device shown in FIG. 7 with the servo loop characteristic in the rotational driving device according to the present invention, it can be understood that the resonance frequency of torsional resonance is improved from 660 Hz, which is of the conventional device, to 864 Hz of the present invention, as shown in FIG. 6.

Industrial Applicability

As described above, in the disc rotational driving device according to the present invention, the turntable mounted on the protruding portion of the rotary shaft protruding from the case is mounted on the rotary shaft at the portion on the proximal end side from the center position in the axial direction, of the protruding portion of the rotary shaft protruding from the case. Therefore, the proper vibration frequency of torsional vibration in the connecting part with the disc is caused to be out of the servo band, and the servo characteristic can be improved.

Therefore, in this rotational driving device, even when the disc loading mechanism including the disc tray for carrying the disc into the recording/reproducing device using this disc rotational driving device from outside is arranged between the disc supported on the turntable and the proximal end side of the rotary shaft protruding from the case of the motor, accurate control of disc rotation can be carried out and the system for carrying out high-speed data reading can be easily constituted. That is, even when the distance between the disc and the rotor must be increased in order to arrange the disc loading mechanism there, the present invention enables designing of a mechanism with a high degree of freedom without deteriorating the servo characteristic.

The present invention provides the disc rotational driving device which enables prevention of generation of torsional resonance in the rotary shaft of the motor as a driving source for rotationally driving the disc and enables accurate rotation of the disc.

What is claimed is:

1. A disc rotational driving device comprising:

a centering mechanism disposed at a distal end of a rotary shaft protruding from a motor case, the centering mechanism having a first portion configured to support a first portion of a bottom of a disc; and a turntable comprising:

a cylindrical center portion defining a center hole, the rotary shaft disposed through the center hole such that the cylindrical portion contacts and extends along the rotary shaft;

a circumferential portion connected to the cylindrical center portion, the circumferential portion surrounding at least portions of the cylindrical center portion and the centering mechanism; and a disc setting portion connected to the circumferential portion, the disc setting portion configured to support a second portion of the bottom of the disc, the disc setting portion separate from the first portion of the centering mechanism, wherein the rotary shaft has a length sufficient to dispose a loading mechanism configured to load the disc to the disc setting portion entirely between the centering mechanism and the disc setting portion.

2. The disc rotational driving device according to claim 1, wherein the centering mechanism comprises a positioning portion configured to position the disc.

3. The disc rotational driving device according to claim 2, wherein the disc setting portion surrounds at least a portion of the positioning portion.

4. The disc rotational driving device according to claim 1, wherein the turntable comprises a substantially conical pedestal-like shape.

5. A disc rotational driving device comprising:

a centering mechanism disposed at a distal end of a rotary shaft protruding from a motor case, the centering mechanism having a first portion configured to support a first portion of a bottom of a disc, and the rotary shaft having a diameter less than a diameter of the disc; and a turntable comprising:

a cylindrical center portion defining a center hole, the rotary shaft disposed through the center hole such that the cylindrical portion contacts and extends along the rotary shaft;

a circumferential portion connected to the cylindrical center portion, the circumferential portion surrounding at least portions of the cylindrical center portion and the centering mechanism; and a disc setting portion connected to the circumferential portion, the disc setting portion configured to support a second portion of the bottom of the disc, the disc setting portion separate from the first portion of the centering mechanism, wherein the rotary shaft has a length sufficient to dispose a loading mechanism configured to load the disc to the disc setting portion entirely between the centering mechanism and the disc setting portion.

6. The disc rotational driving device according to claim 5, wherein the cylindrical center portion, the circumferential portion, and the disc setting portion are integrally formed such that the turntable is disposed on the rotary shaft by disposing the rotary shaft in the center hole of the cylindrical center portion.

7. The disc rotational driving device according to claim 5, wherein the turntable comprises a substantially conical pedestal-like shape.

8. The disc rotational driving device according to claim 5, wherein the centering mechanism comprises a positioning portion configured to position the disc.

9. The disc rotational driving device as claimed in according to claim 8, wherein the positioning portion is mounted on the rotary shaft so that it is surrounded by the disc setting portion on the inner side of the turntable surrounds at least a portion of the positioning portion.

* * * * *